April 7, 1953 W. I. L. WU ET AL 2,634,393
CONVERSION SYSTEM
Filed Aug. 14, 1944
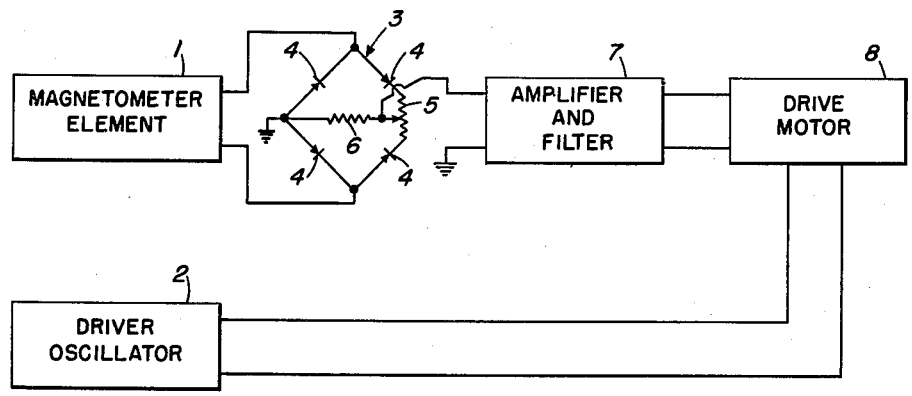
INVENTORS
**WILLIAM I. WU
VICTOR V. VACQUIER**
BY
ATTORNEYS Patented Apr. 7, 1953

2,634,393

UNITED STATES PATENT OFFICE 2,634,393

CONVERSION SYSTEM

William I. L. Wu, New York, and Victor V. Vacquier, Garden City, N. Y., assignors to the United States of America as represented by the Secretary of the Navy Application August 14, 1944, Serial No. 549,434

4 Claims. (Cl. 321—8)

1

This invention relates to an improved conversion system, and more particularly to a method of and means for converting an input signal comprising a series of pulses of alternate polarity but of different amplitudes into an output signal comprising a series of pulses of a single polarity and of uniform amplitude.

The conversion system of the present invention is especially adapted for utilizing the pulse output from the saturated-core magnetometer, as for example the unbalanced magnetometer disclosed in copending application Serial No. 516,612, filed January 1, 1944, now Patent No. 2,560,132, and particularly when such a magnetometer is employed in an orientation system such as that disclosed in copending application Serial No. 532,144, filed April 21, 1944, for Orientation System, by Otto H. Schmitt. The output from such a magnetometer comprises a series of pulses of alternate polarity, information regarding the orientation of the magnetometer element with respect to the magnetic field surrounding it being conveyed by the relative amplitudes of these pulses.

In the construction of a magnetic stabilization system of the type disclosed, for example in copending application Serial No. 529,003, filed March 31, 1944, it has been found difficult to avoid some mechanical and electrical asymmetries, with the result that the output signals from the orientor magnetometers indicate some displacement even when the detector-magnetometer element is aligned exactly with the magnetic field. In the past, this difficulty has been overcome by passing a small bias current through the orientor-magnetometer elements, this current being adjusted to produce zero resultant flux, and hence an orientor-magnetometer output signal comprising a series of pulses of alternate polarity but of equal amplitude, when the detector-magnetometer element is properly aligned. This current was obtained from batteries the voltage of which was subject to some fluctuations with temperature and time, hence requiring frequent readjustments of the bias current and therefore complicating the operation of the stabilization system as a whole.

It is an object of the present invention to eliminate the disadvantages inherent in previous methods of overcoming minor asymmetries in the head assembly by employing electrical, as distinguished from magnetic, adjusting means.

In order to accomplish this, the output of the orientor magnetometer is supplied to a conversion system in accordance with the present invention, this system being adapted to provide an adjustment for minor discrepancies in the heights of the pulses of the two different polarities which may exist even when the detector-magnetometer element is in exact alignment with the magnetic field.

The invention contemplates, in one aspect, the method of converting an input signal comprising a series of pulses of alternate polarity, those of one polarity having an amplitude different from those of the other polarity, into an output signal comprising a series of pulses of a single polarity and of uniform amplitude. This method comprises the steps of selecting and reversing the polarity of alternate pulses of the input signal, combining the reverse pulses with the remaining pulses of the input signal to provide a series of pulses of a single polarity but of different amplitudes, and varying the relative strengths of the reversed and the remaining pulses to render the pulses of the output signal substantially uniform in amplitude. In another aspect of the invention, means for carrying out the above method are contemplated.

For a better understanding of the invention, together with other and further objects thereof, reference is made to the following description taken in connection with the accompanying drawing, and its scope will be pointed out in the appended claims.

The single figure of the drawing shows, partly in block form, a conversion system in accordance with the present invention, in combination with additional elements comprising an orientation system.

Referring now to the drawing, there is shown a magnetometer element 1 which is provided with a suitable driving voltage from driver oscillator 2. The output of magnetometer element 1 is supplied to bridge-type rectifier 3 comprising four varistors 4 and potentiometer 5. The output voltage of rectifier 3, which is developed across resistor 6 connected between the movable arm of potentiometer 5 and ground, is supplied to amplifier and filter unit 7, which in turn is connected to one field winding of driver motor 8. The other field winding of motor 8 is connected to driver oscillator 2.

In operation, the output of magnetometer element 1 comprises a series of pulses of alternate polarity having a pulse frequency equal to twice the frequency of the driving voltage supplied by oscillator 2. When magnetometer element 1 is positioned with its axis perpendicular to the direction of the magnetic field, the height of the pulses of one polarity is nominally equal to that of the pulses of the other polarity. When this series of pulses is subjected to full-wave rectification in unit 3, the pulses of one polarity are inverted, so that the output of unit 3 comprises a series of pulses of a single polarity and nominally of the same amplitude. It is the purpose of potentiometer 5 to provide means for adjusting the relative strength of the output-signal pulses until they are of substantially the same amplitude, in spite of minor asymmetries, either mechanical or electrical, which may exist in the magnetometer element or its associated equipment. Once set, potentiometer 5 does not change with temperature and time, and hence frequent readjustment is unnecessary.

When potentiometer 5 is properly adjusted, therefore, the signal appearing across resistor 6 comprises a series of pulses of a single polarity and of uniform amplitude whenever magnetometer element 1 is positioned at right angles to the direction of the magnetic field. This output signal is supplied to amplifier and filter unit 7, which in turn energizes one field winding of drive motor 8 with a voltage having a frequency twice that of the driving voltage developed by driver oscillator 2. Since the other field winding of motor 8 is energized by a voltage of the proper phase and having the same frequency as that of the driving voltage, the motor remains stationary. If magnetometer element 1 is displaced in one sense or the other from perpendicularity with the magnetic field, the pulses of one polarity in the output of the magnetometer element increase in height and those of the other polarity simultaneously decrease, with the result that a component of fundamental frequency appears at the output of unit 7 and causes drive motor 8 to rotate in the proper direction. A displacement of magnetometer element 1 in the opposite sense from its initial perpendicular position produces an opposite effect upon the pulse heights at the output of the magnetometer element, and correspondingly a rotation of motor 8 in the opposite direction. The above-described operation of the orientation system as a whole is disclosed in the above-mentioned copending application Serial No. 532,144, filed April 21, 1944, for Orientation System, by Otto H. Schmitt, and is not encompassed by the present invention.

It will be apparent from the above description that the present invention provides a conversion system which is especially suitable for use in overcoming the undesirable effects of minor electrical or mechanical asymmetries in the orienting portion of a magnetic stabilization system. This particular use of the conversion system in accordance with the present invention is described merely by way of example, and is not to be construed as being the only advantageous application thereof.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. For use with an orientor magnetometer element, a bridge circuit operable to convert a series of pulses of alternate polarity produced by a magnetometer element to a series of pulses of a single polarity and adjustable to eliminate variations in the amplitude of the respective pulses due to mechanical and electrical asymmetries inherent in a magnetometer element and its associated equipment, said bridge circuit comprising a pair of junction points arranged to be connected to the output leads of a magnetometer element, first and second legs extending from one said junction point, third and fourth legs extending from the other said junction point, the opposite ends of said first and third legs being interconnected through the resistance of a potentiometer and the opposite ends of said second and fourth legs being connected together and to ground at one end of a resistor which is connected at its other end to a movable arm in said potentiometer arranged to move in sliding contact with said resistance, and a rectifying means so disposed in each leg that alternate pulses of opposite polarity travel alternate paths, one including said first leg, said resistor, and said fourth leg, and the other including said third leg, said resistor, and said second leg, whereby a signal may be picked off said resistor which comprises a series of pulses of a single polarity and said movable arm may be moved along said resistance in said potentiometer to render the alternate pulses of this signal equal in amplitude.

2. In combination with a magnetometer element, a bridge circuit connected to the output thereof to convert a series of pulses of alternate polarity produced by the magnetometer element to a series of pulses of a single polarity and adjustable to eliminate variations in the amplitude of the respective pulses due to mechanical and electrical asymmetries inherent in the magnetometer element and its associated equipment, said bridge circuit comprising a pair of junction points arranged to be connected to the output leads of said magnetometer element, first and second legs extending from one said junction point, third and fourth legs extending from the other said junction point, the opposite ends of said first and third legs being interconnected through the resistance of a potentiometer and the opposite ends of said second and fourth legs being connected together and to ground at one end of a resistor which is connected at its other end to a movable arm in said potentiometer arranged to move in sliding contact with said resistance, and a rectifying means so disposed in each said leg that alternate pulses of opposite polarity travel alternate paths, one including said first leg, said resistor, and said fourth leg, and the other including said third leg, said resistor, and said second leg.

3. For use with a magnetic orientation system including an orientor magnetometer element and a drive means responsive to signals from the magnetometer element, a bridge circuit operable to convert a series of pulses of alternate polarity produced by a magnetometer element to a series of pulses of a single polarity and adjustable to eliminate variations in the amplitude of the respective pulses due to mechanical and electrical asymmetries inherent in a magnetometer element and its associated equipment, said bridge circuit comprising a pair of junction points arranged to be connected to the output leads of a magnetometer element, first and second legs extending from one said junction point, third and fourth legs extending from the other said junction point, the opposite ends of said first and third legs being interconnected through the resistance of a potentiometer and the opposite ends of said second and fourth legs being connected together and to ground at one end of a resistor which is connected at its other end to a movable arm in said potentiometer arranged to move in sliding contact with said resistance, and a rectifying means so disposed in each said leg that alternate pulses of opposite polarity travel alternate paths, one including said first leg, said resistor, and said fourth leg, and the other including said third leg, said resistor, and said second leg, whereby a signal may be picked off said resistor which comprises a series of pulses of a single polarity and said movable arm may be moved along said resistance in said potentiometer to render the alternate pulses of this signal equal in amplitude.

4. In combination with a magnetic orientation system including an orientor magnetometer element and a drive means responsive to signals from the magnetometer element, a bridge circuit connected to the output of said magnetometer element to convert a series of pulses of alternate polarity produced by the magnetometer element to a series of pulses of a single polarity for transmission to said drive means and adjustable to eliminate variations in the amplitude of the respective pulses due to mechanical and electrical asymmetries inherent in the magnetometer element and its associated equipment, said bridge circuit comprising a pair of junction points arranged to be connected to the output leads of said magnetometer element, first and second legs extending from one said junction point, third and fourth legs extending from the other said junction point, the opposite ends of said first and third legs being interconnected through the resistance of a potentiometer and the opposite ends of said second and fourth legs being connected together and to ground at one end of a resistor which is connected at its other end to a movable arm in said potentiometer arranged to move in sliding contact with said resistance, and a rectifying means so disposed in each said leg that alternate pulses of opposite polarity travel alternate paths, one including said first leg, said resistor, and said fourth leg, and the other including said third leg, said resistor, and said second leg.

WILLIAM I. L. WU.
VICTOR V. VACQUIER.

REFERENCES CITED

The following references are of record in the file of this patent:

UNITED STATES PATENTS

| Number | Name | Date |
|---|---|---|
| 972,892 | Meyer | Oct. 18, 1910 |
| 1,665,397 | Wunsch | Apr. 10, 1928 |
| 2,049,306 | Matson | July 28, 1936 |
| 2,066,333 | Caruthers | Jan. 5, 1937 |
| 2,320,175 | Dennis et al. | May 25, 1943 |

FOREIGN PATENTS

| Number | Country | Date |
|---|---|---|
| 5,413 | Great Britain | of 1909 |